(12) United States Patent  
Crystal (10) Patent No.: US 8,661,364 B2  
(45) Date of Patent: Feb. 25, 2014

(54) PLANETARY GRAPHICAL INTERFACE

(75) Inventor: Steve Crystal, San Francisco, CA (US)

(73) Assignees: Sony Corporation, Tokyo (JP); Sony Connect Inc., Los Angeles, CA (US)

(*) Notice: Subject to any disclaimer, the term of this patent is extended or adjusted under 35 U.S.C. 154(b) by 786 days.

(21) Appl. No.: 12/001,570

(22) Filed: Dec. 12, 2007

(65) Prior Publication Data

US 2009/0158196 A1 Jun. 18, 2009

(51) Int. Cl.
*G06F 3/048* (2013.01)
*G06F 3/00* (2006.01)

(52) U.S. Cl.
USPC ........... 715/789; 715/738; 715/744; 715/767; 715/783; 715/788; 715/846

(58) Field of Classification Search
USPC ......... 715/719, 721, 733, 738, 783, 788, 846, 715/744, 767, 789
See application file for complete search history.

(56) References Cited

U.S. PATENT DOCUMENTS

| | | | |
|---|---|---|---|
| 6,545,209 B1 * | 4/2003 | Flannery et al. | 84/609 |
| 7,120,619 B2 * | 10/2006 | Drucker et al. | 706/45 |
| 7,707,137 B2 * | 4/2010 | Nazarian et al. | 707/752 |
| 7,730,429 B2 | 6/2010 | Kruse et al. | 715/855 |
| 7,743,009 B2 * | 6/2010 | Hangartner et al. | 706/46 |
| 2003/0158855 A1 * | 8/2003 | Farnham et al. | 707/102 |
| 2006/0218122 A1 | 9/2006 | Poston et al. | 707/1 |
| 2007/0033220 A1 * | 2/2007 | Drucker et al. | 707/103 R |
| 2007/0083818 A1 * | 4/2007 | Drucker et al. | 715/767 |
| 2008/0214156 A1 * | 9/2008 | Ramer et al. | 455/414.1 |

FOREIGN PATENT DOCUMENTS

WO WO 2006/113970 11/2006 ............ G06F 17/27

* cited by examiner

*Primary Examiner* — Nicholas Augustine
(74) *Attorney, Agent, or Firm* — Mark D. Wieczorek; Mayer & Williams PC (57) ABSTRACT

A graphical interface and method are provided for search and browse functionality implemented in client or server software. The software includes a file browsing functionality for items in a repository of items such as an online store. The items may be products such as online media downloads, games, merchandise, etc. A graphical metaphor used by this GUI is that of planets or planet nodes circling a seed node. Items displayed as planets are content items relevant to the seed, and are typically though not necessarily of like kind as the seed, whether song, file, movie, video game, etc.

15 Claims, 7 Drawing Sheets

PLANETARY GRAPHICAL INTERFACE

CROSS-REFERENCE TO RELATED APPLICATIONS

1. Field of the Invention

The invention relates to graphical interfaces, and more particularly to graphical interfaces for browsing and searching for content items.

2. Background

User interfaces and methods for finding products in, e.g., online shopping websites, may be operated in several ways. One is by a user entering a search string in a field, such as a keyword or title, the string pertaining to a product. A search engine then compares the search string to fields in a product or item description, and/or to accompanying metadata. Such methods are primitive and tend to only return search results in a linear textual list which include such search strings literally in the product description or in metadata.

Another way to find products is by browsing. In this way, the user may specify a category or type of product and then review various products present in the category. In some such systems, the user can progressively narrow the field of relevant products according to a user-determined scheme.

In these methods, the user may scan the search results or categorized list of products and make decisions regarding purchasing, including in a wish list, or taking any number of other actions.

While such prior art user interfaces are sufficient for simple searches, if a user wishes to search for items that are similar to a given item but not described or named in the original query, then such interfaces fail. Moreover, users often find the use of such interfaces and methods cumbersome to use.

SUMMARY

In one aspect, the invention involves a graphical interface and method for search and browse functionality implemented in client or server (web) software. The software includes a file browsing functionality for items in a repository of items such as an online store. The items may be products such as online media downloads, games, merchandise, etc. The system can also be implemented in the context of a desktop application with many types of search domains, e.g., files, songs, movies, documents, and so on. The system can thus be employed to search and browse for content items or other files stored on a user's personal computer.

A graphical metaphor used by this GUI is that of planets or planet nodes circling a seed node. Items displayed as planets are content items relevant to the seed, and are typically though not necessarily of like kind as the seed, whether song, file, movie, video game, etc. Put another way, the seed node is a representation of a single data entity and the planets each represent related single data entities, typically of the same data type.

The seed or seed node references a content item, the content item itself being composed of seed data. The planets represent items related to the seed by having the same, similar, or related metadata. Metadata are typically included with media files or other files pertaining to, e.g., products, and may be organized into different categories such as: artist, album, recording date, genre, release date, etc. In some embodiments this is not required—a mere identification of a track may be enough to derive information and data relations from the database. Whether the seed actually displays the seed information depends on the screen real estate and the implementation. Typically, however, the seed would display a title, e.g., the title of a song that is the subject of a browsing function for similar songs or songs related by some aspect of their associated metadata. The distance of a planet from the seed represents (and may be inversely related to) the relevancy of the displayed search results, i.e., the relevancy of displayed planets.

In another aspect, the user interface is directed to planetary category nodes circling a central node. The category nodes represent different categories such as: artist, album, recording date, genre, release date, etc., and are selectable by the user. Like in the first aspect, the central node serves as an indication of search parameters or seed data, i.e., that which is searched.

The distance of a node from the central node represents (and may be directly related to) the weighting of that category and/or the breadth of the search within that category. For example, a user may wish to search for music of a particular genre recorded near a certain date. In this case, the central node may represent music in genre X recorded on date Y, and two category nodes may be displayed: genre and date. The user then sets the nodes at desired distances from the central node, the distance depending on how closely the user desires the search results to correspond to the central node. E.g., if the user desires search results very closely related in genre, the genre node would be set close to the central node. If the user is more ambivalent about when the music was recorded, the date node may be set far away from the central node.

Thus, the closeness of a category node may relate to breadth of search, but the same may be thought of as "weighting" as well: the more weight is given a particular search parameter, the closer the cluster of search results should be around that search term.

The details of a node depend on the category. A date node may use a closer planet to represent a date closer to the date in the search criteria. A genre node may use a closer planet to indicate genres "more like" the search criteria genre and a farther planet to indicate genres "less like" the search criteria genre.

Once the user has set the nodes as desired, they can activate a search, the results of which may be displayed along with the planetary interface. The user can adjust the nodes, and the search results may update accordingly. Alternatively, for ease of use, the act of setting the nodes, or even the act of entering the seed data or search parameters, may cause a search to be run, with default parameters inserted where necessary.

In an alternative embodiment, the user may employ the interface to set the category information for a given product. In this embodiment, search results for products similar to the given product may be displayed before, during, or after the user sets such category information.

In aspect, the invention is directed towards a method of browsing for content items in a repository containing a plurality of content items, at least one item of metadata associated with each content item to be searched. The method includes steps of receiving seed information; displaying a seed node indicating the seed information; and displaying at least one planet a distance from the central node, the planet relevant to the seed information.

Implementations of the invention may include one or more of the following. The seed information may be selected from the group consisting of: a song, a movie, a video game, an album, an artist, a genre, and a combination of these. The seed information may be received from a form containing user-entered text or by a user selecting a content item. The seed information may be received by a user selecting a content item, further including: receiving seed information about the content item; displaying a seed node indicating the seed information; and displaying at least one planet a distance from the central node, the planet relevant to the seed information. The seed information may be received via a user selecting a content item, where the content item is one that is currently playing or is currently being played back. The method may further include displaying at least one category link adjacent the displayed planet, wherein by selecting the category link, at least one additional planet is displayed, the at least one additional planet indicating at least one additional content item related to the first planet in at least one type of metadata that is the same as metadata in the seed. The repository may be a collection of content items stored on one or more servers connected to the internet, the collection associated with an online store. Alternatively, the repository may be a collection of content items stored on a local area network or on a computer. The distance of the planet from the seed node may be inversely related to the relevance of the planet to the seed information, while the size of the planet may be directly related to the relevance of the planet to the seed information. The planet may indicate that no result was found. In a related aspect, the invention is directed towards a computer-readable medium containing instructions for causing a computer to implement the above.

In another aspect, the invention is directed towards a user interface for displaying the results of a browsing or searching operation on a repository of content items, including a seed node indicating seed information that is the basis of a browsing or searching operation. In this user interface, if the browsing or searching operation results in the discovery of at least one content item relevant to the seed node, then the user interface further includes a planet indicating the content item, while if the browsing or searching operation fails to result in the discovery of at least one content item relevant to the seed node, then the user interface further includes an indicator of a null result for the browsing or searching operation.

Implementations of the invention may include one or more of the following. The interface may further include at least one node adjacent the displayed planet, wherein by selecting the node, at least one additional planet is displayed, the at least one additional planet indicating a null result or at least one additional content item related to the one planet and to the seed information in at least one type of metadata.

In another aspect, the invention is directed towards a method of setting category information or metadata for a content item or group of content items, including steps of: providing an entry window for a user to select a content item or a group of content items; populating a window with at least one central node and at least one category node, the category node indicating a category of metadata pertaining to the content item or group of content items; adjusting a distance of the category node from the central node, the distance indicating the value of the metadata within the category of metadata, such that the metadata value for the category of the content item is set by the adjusting.

In another aspect, the invention is directed towards a method of searching for one or more content items in a repository containing a plurality of content items, at least one item of metadata associated with each content item to be searched, including steps of: displaying at least one category node, the category node associated with a category of metadata; receiving user input about a location of the category node, the location of the category node associated with a value of the metadata contained within the category; conducting a search, the search results determined at least in part by comparing the value of the metadata associated with the location of the category node with the value of metadata associated with each of a plurality of content items in a repository; and displaying search results from the search.

Implementations of the invention may include one or more of the following. The displaying step may include displaying search results in a list in a window. The displaying search results step may occur automatically, via user selection of a search function or via user entering of a seed content item, and may further include: automatically displaying at least one category node applicable to the seed content item as determined by a look-up table keyed to at least one metadatum associated with the seed content item; and setting a default search range based on at least one metadatum available about the seed content item. The displaying at least one category node step may include a step selected from the group consisting of: displaying at least one category node according to a look-up table based on the seed content item; displaying at least one category node according to a user selection; displaying at least one category node according to a type of content searched; and a combination of at least two of the above.

Advantages of the invention may include one or more of the following. The user may enjoy an easy-to-use but powerful user interface for browsing and searching repositories of content items. The user may be conveniently presented with content items relevant to a search query, and may easily browse the displayed items, creating a useful and fluid browsing experience. The user may easily find additional related content with a single click by making one of the planets the seed.

Other advantages will be apparent from the description that follows, including the drawings and claims.

DETAILED DESCRIPTION

The following terms, defined here, are used throughout the specification and attached figures.

"Items of content" or "content items" refer to data files or products or any other article or merchandise for which a user may search. Examples include media files such as audio files or video files, such as songs or movies. Other examples include videogames and other digital media. Other examples are products in an electronic commerce environment, where metadata may include price, popularity, release date, product category, whether the item is on sale, etc. Analog products and other physical products may also be subjects of user browsing or searches. Items of content typically have metadata associated with them, such as, for music items, artist, album, release date, genre. It should be noted that such metadata may be considered items of content themselves, to the extent that a user can browse or search for them. For example, although an artist name may only exist as metadata, users can employ the system and method to search or browse for an artist by name. The data within a data file for an item of content is termed "seed data".

The "seed node" or just "seed" refers to information, also termed seed information, on which a browsing function or search is based. In some embodiments, the browsing function is only partially based on the information in the seed node. Moreover, the results of the system and method of the invention, i.e., browsing results themselves, may be easily entered as seed nodes, e.g., by clicking on the planet representing the result. Seed nodes often represent a particular content item, e.g., a song, movie, or video game. Seed nodes may be generated by a menu item such as "CREATE SEED NODE" in a selectable interface accessible whenever a content item is selected or is active. Seed nodes may also be based on information entered by a user in a form, such as a search string. Depending on context, the "seed node" may also refer to a graphical representation of the information contained therein, and is generally displayed at or near the center of a graphical interface.

"Planets" or "planet nodes" refers to graphical representations of content items similar to, relevant to, or pertaining to the seed data. Often, planets pertain to various metadata about the seed data. For musical items of content, planets may include, e.g., songs related to the seed node by genre, artist, album, tempo, etc. Planets are often, but need not always be, of like kind as the seed. In the case where a searching or browsing function is performed based on a seed and no results are found beyond the seed content item itself, then a planet may be displayed indicating that no additional results were located, i.e., that a null result was obtained.

A "repository" of content items refers to that collection of content items that is searched or is searchable. The collection need not all reside on one server, rather, especially in a peer-to-peer file sharing system, they may generally reside on different systems. A repository may be an online store or other such enterprise. A repository may also be a single computer or LAN or WLAN.

A "source of metadata" refers to a standard database whereby metadata about content items may be obtained. For example, the website imdb.com is a source of metadata about movies, and allmusic.com is a source of metadata about music. In some cases, the source of metadata may be the same as the repository. A source of metadata may be employed in some embodiments of the invention, but in any event is not required.

Figure 1:
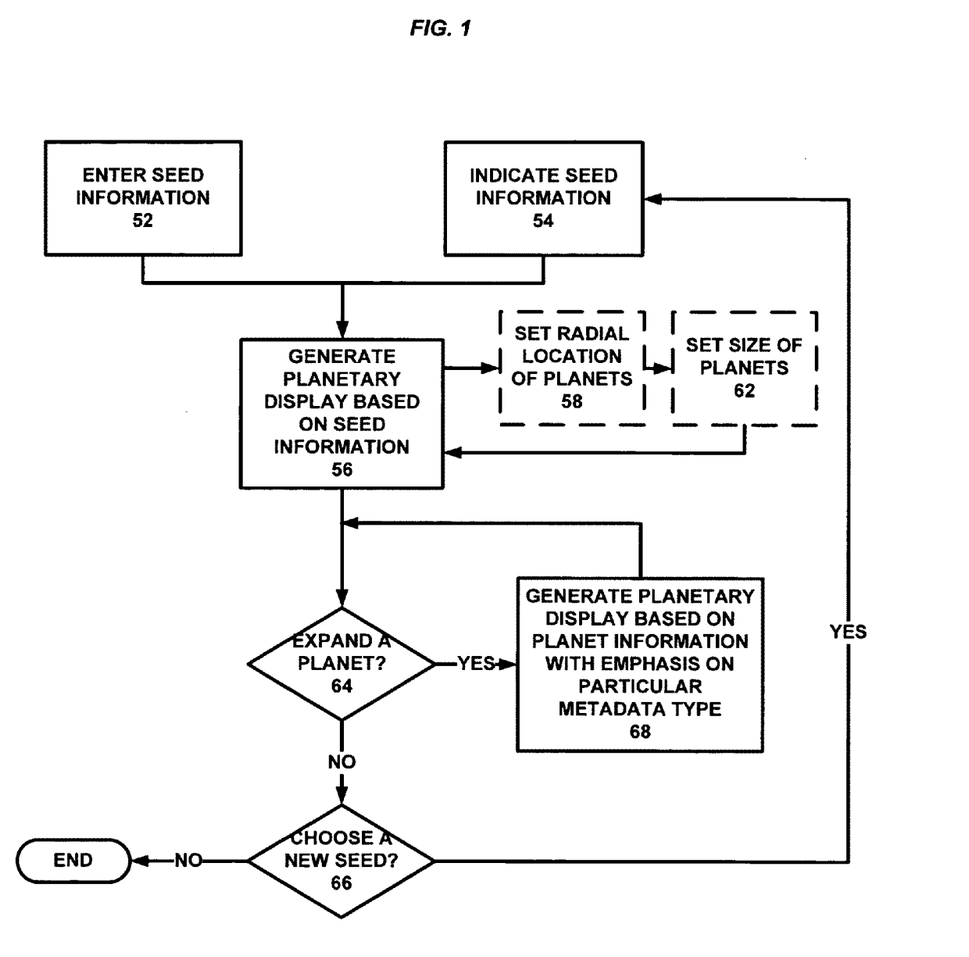
FIG. 1 illustrates a flow chart of a method according to an embodiment of the invention.

The interface system and method allows for browsing and searching for items of content in a repository. A first step involves entering or otherwise causing the input of seed information into a seed node. The second step involves using the seed information to browse and navigate to relevant files. FIG. 1 illustrates both steps.

Referring to FIG. 1, a user may enter the seed information, i.e., the information that is the starting point for a browsing operation, or information to be searched, by way of a form or other known user interface (step 52). The seed information may also be obtained via a user operation on a given file that is displayed (step 54), in a manner described below. In this connection it is noted that the user operation may be not just on a given file but on the representation of an item in a user interface, e.g., a picture of a product in an online store.

In the former, the user enters information such as text into a form or other user interface. The information then becomes the seed information. The form may employ one or multiple fields, and the information itself may be very specific, very general, or at any level of specificity in between. For example, the user may enter the term "blues". Blues, being a genre of music, is fairly general. The user may also enter a specific blues song title, which may be more specific. However, the level of specificity need not directly determine how many search or browsing results are obtained and displayed. While blues as a genre of music is fairly general, there may be only a few genres of music that are similar to blues, and thus only a few search or browsing results. While a song title is specific, a popular song may have many cover versions recorded, and each of these may constitute a search result. Additional details on these aspects are discussed below.

A second manner of obtaining seed information is by a user operation on a displayed file or item representation. For example, a user may be viewing, in an active window display, a list of files in a folder. Each may be, e.g., a separate music file. By indicating a particular file, such as via, e.g., right-clicking on the same, a menu may be displayed, one of the entries of which is for "GENERATE PLANETARY DISPLAY" or simply "FIND MORE LIKE THIS" or the like. The chosen item, or information about the chosen item, such as metadata, then becomes the new seed.

In another version of this embodiment, a user may be playing back a media file or examining a product in an online store. In either case, a suitable user interface may be provided to select the media file or product and make the same the seed node of a planetary graphical interface.

In any case, appropriate metadata may be retrieved about the file, media item, or content item, e.g., from a source of metadata. The metadata then serves as the basis for the search or browsing functionality.

Figure 2:
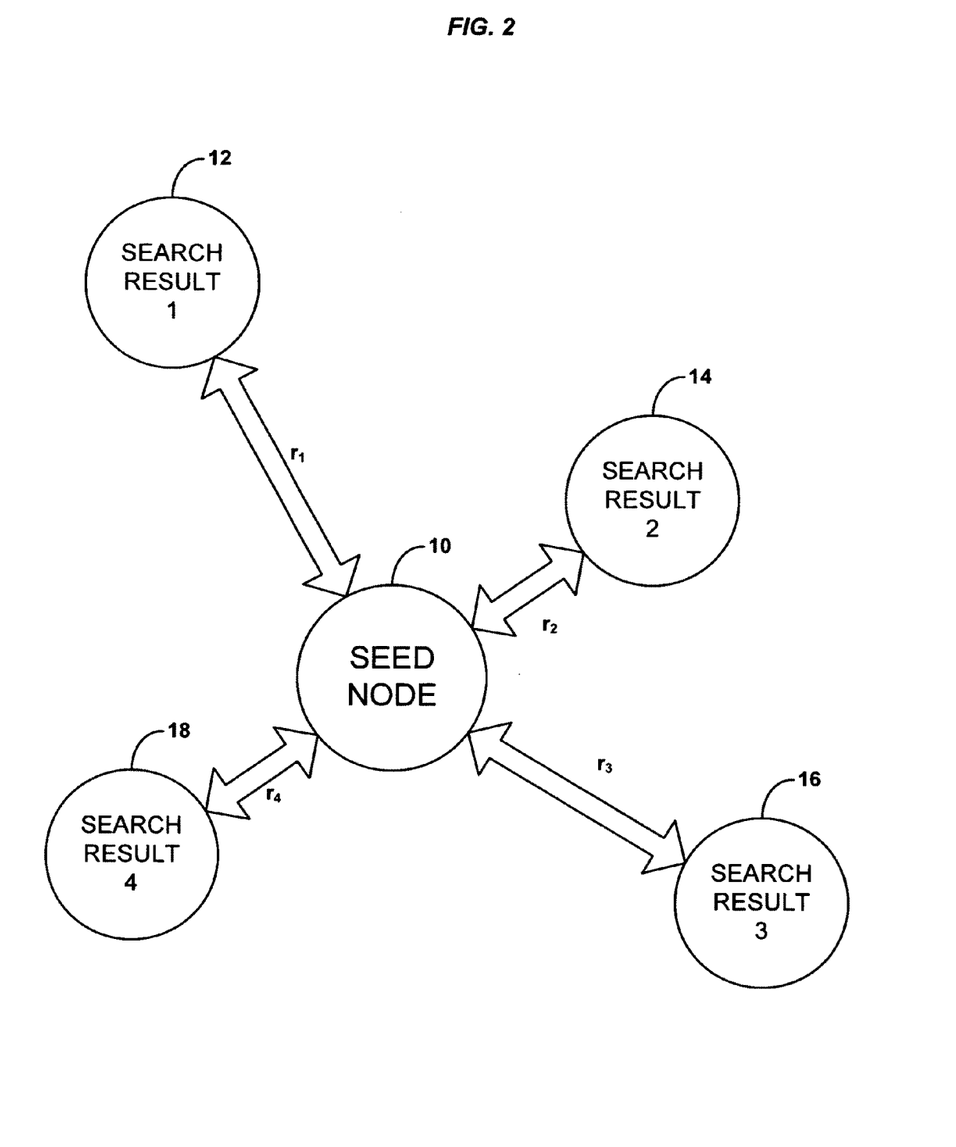
FIG. 2 illustrates a graphical user interface of a browsing functionality according to an embodiment of the invention.
Figure 3:
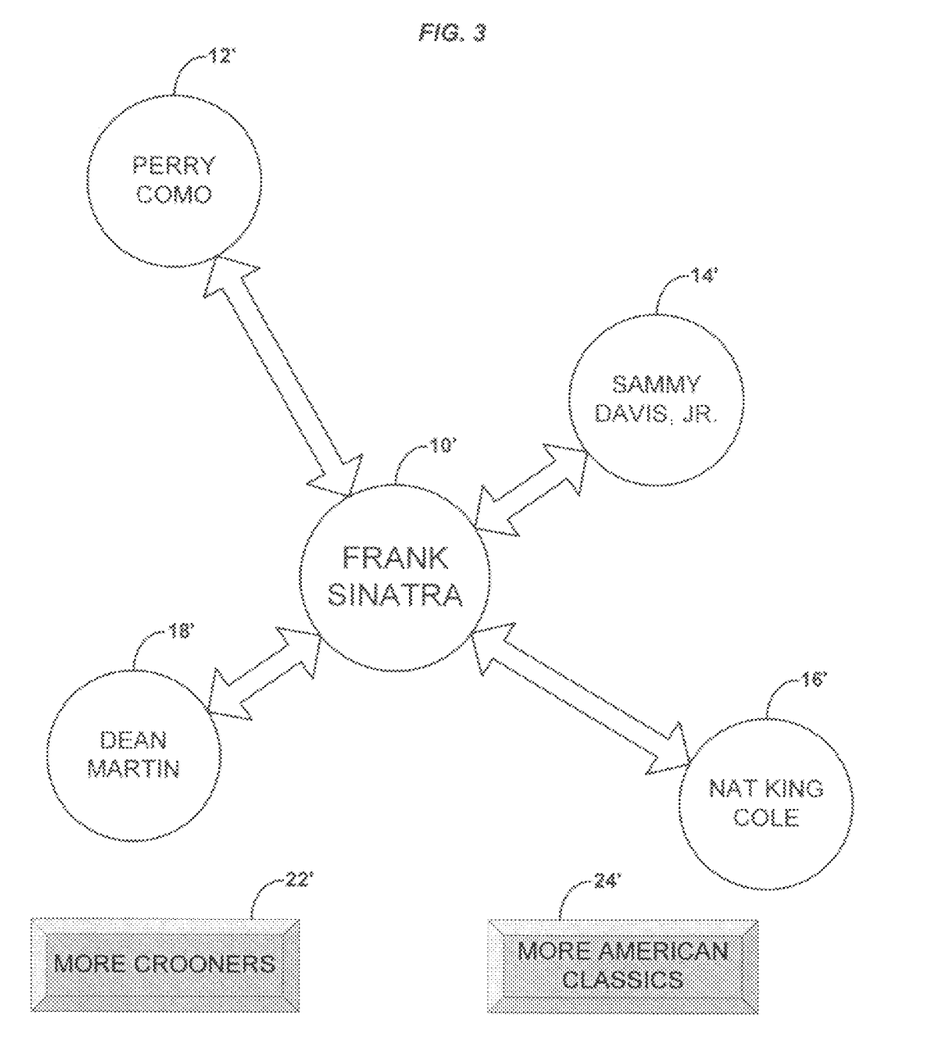
FIG. 3 illustrates an example of the graphical user interface of FIG. 2.
Figure 4:
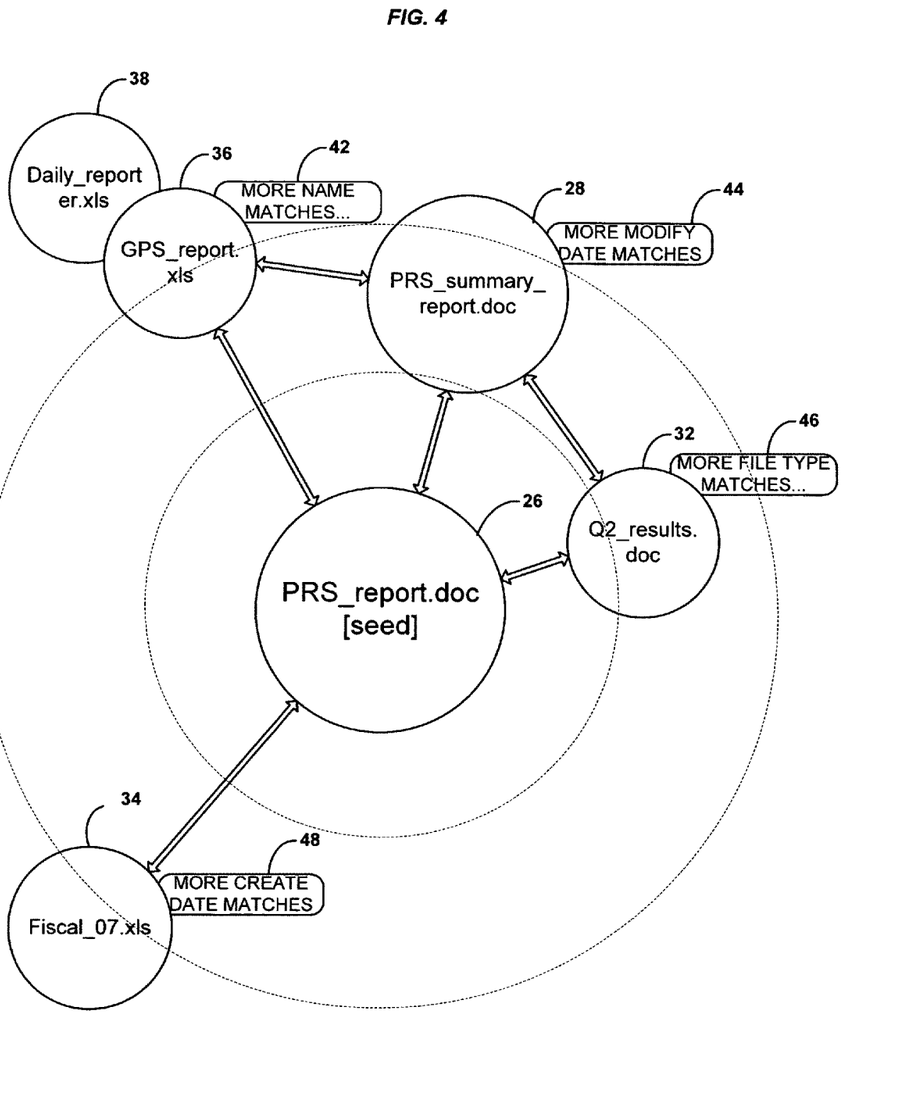
FIG. 4 illustrates a more detailed example of the graphical user interface of FIG. 2, showing various planets of different types.

Once the seed information has been obtained, i.e., the seed node has been populated in some manner, the browsing functions may commence. This need not be a separate step performed by the user: the user's act of entering, or in any other way populating the seed node, may be sufficient per se to cause a browsing function to occur, resulting in a display such as is shown in FIGS. 2-4. In an alternative embodiment, the browsing or searching functions may commence upon user selection of a suitable "BROWSE" or "SEARCH" button.

Referring to FIG. 2, a planetary display has been generated based on the seed information (see also step 56 of FIG. 1). A seed node 10 containing seed data is shown with search results 1-4 represented by planets or circles 12, 14, 16, and 18, each disposed at distances $r_1$, $r_2$, $r_3$, and $r_4$, respectively, from the seed node 10.

In particular, the system and method display a set of planets or "search results" based on the seed and the metadata pertaining thereto. The planets are disposed at distances inversely pertaining to the relevancy of the search result as compared to the seed (step 58 of FIG. 1). The size of the planets may also be employed to indicate the same or complementary information to the user (step 62 of FIG. 1).

For example, if a song title is entered as the seed, the system and method may automatically browse a music repository, such as an online site or the user's computer or network, for music that is similar to the seed, as such similarity is determined on the basis of accompanying metadata or a similar basis. For example, metadata pertinent to a musical seed may include "release date", "genre", and "tempo".

As another example, if an artist name is entered as seed data, the system and method may automatically browse a music repository for music that is similar to the seed artist. Referring to FIG. 3, seed 10' has been input, the seed being 'FRANK SINATRA'. Artists are shown in search results 12', 14', 16', and 18', these artists being related on the basis of metadata. The planets 14' and 18' may be closer as these artists have more in common with the seed artist, and thus their metadata, in this hypothetical, have greater overlap than the other planets, and are thus deemed to be more relevant.

Buttons may also be provided for additional functionality, as shown in FIG. 3 at the bottom of the display. Exemplary buttons are shown such as "MORE CROONERS" 22' and "MORE AMERICAN CLASSICS" 24'. The former may be employed to locate other artists similar to the seed artist, i.e., Frank Sinatra. The latter may be employed to locate songs classified as "AMERICAN CLASSICS", which in this example is deemed exemplary of the type of music the seed artist was associated with. Variations are abundant.

In one embodiment, the planets, i.e., the search result nodes, are all of like kind as the seed or seed node. However, they need not be. For example, the user may enter "BLUES" into the seed, and the system may display not only a BLUES category but also major blues artists and blues songs as well.

Various actions may occur following presentation of a user interface such as FIGS. 2-3. Clicking on a planet (see step 66 and subsequent step 54 of FIG. 1) may cause the planet to be substituted as the new seed in the current window. Alternatively, clicking on a planet may cause the planet to become a new seed in a new window overlaid on top of the current window. In any case, once a new seed is created, the system creates a system of planets surrounding the same in the same manner as described above.

A BACK functionality may be employed. In this way, clicking a BACK button causes the display to revert back to the previously-displayed seed/planet system. In this way, the user may reverse their steps if a mistaken path is inadvertently pursued.

The system may also learn over time. Known techniques may be employed, such as via use and analysis of cookies, as well as via recording user prior actions, to allow the system to attribute more or additional relevance to results in which the user has previously shown interest. Similarly, the system may learn, e.g., whether the user is often interested in results that are far away from the seed in terms of relevance. In this case, the system may provide more results of this nature. The converse situation may also be built into the system.

The system may provide a default or intermediate level of results until the same has learned the typical desires of the user. For example, upon first use, the system may provide results very close to the seed as well as far-flung outlying planets. Once the system learns that the user is typically interested only in the former or only in the latter, the other may be reduced in prevalence for future searches.

FIG. 4 shows a more complicated user display. Here, the seed 26 is a word processing file, PRS_report.doc. Once this is entered as the seed, planets appear which are pertinent to the seed 26. For example, the file Q2_results.doc (node 32) appears, due to its status as a word processing file (i.e., the same file type as the seed). Node 28 also appears, PRS_summary_report.doc, which shares much of the same filename as the seed, as well as being of the same file type. In this example, node 28 is close to the seed in terms of its "last modified" date as well. For all these reasons, node 28 is larger, indicating that it is deemed more relevant than node 32. Node 36 also appears, GPS_report.xls, which shares some of the same filename as the seed, but is of a different file type. Consequently, node 36 is smaller than node 28, and farther away. Node 34 also appears, Fiscal_07.xls, which in this example was created at a time near to that of the seed.

In FIG. 4, certain of the planets have adjacent category links which allow the user to browse for more matches corresponding to the given planet and metadata type. This is termed "BROWSE CATEGORY" or "EXPAND PLANET" (step 64) in FIG. 1. For example, as node 28 was displayed due to its "last modified" date, a category link 44 is presented to the user where by clicking the category link the user can view additional "last modified" date matches. As node 36 was displayed due to its name match, a category link 42 is presented to the user where by clicking the category link the user can view additional name matches. As node 32 was displayed due to its file type match with the seed information, a category link 46 is presented to the user where by clicking the category link the user can view additional file type matches. Finally, as node 34 was displayed due to its match with the seed regarding date of creation, a category link 48 is presented to the user where by clicking the category link the user can view additional creation date matches. Given that the seed and the planets share metadata in common, the category link may use either the seed or the planet as the basis for finding additional items via a category link button.

Also seen in FIG. 4 is node 38 corresponding to Daily_reporter.xls. This node appears due to its closeness in relevant metadata to node 36, thus giving the user the option to browse this file, or make the same a new seed, if desired.

In a related embodiment, each planet may be surrounded with suitable nodes allowing expansion to occur via any metadata category. In another related embodiment, the use of colored planets may be employed to show metadata matches on one or more categories of metadata, allowing a convenient way to detect planets that match a given seed in more than one type of metadata, e.g., in creation date as well as file name. Alternatively, the links, rather than the planets, may be multicolored to indicate a similar property.

Another aspect of the invention is described below. In this embodiment, the following additional definitions are employed.

"Category nodes" refers to graphical representations of data pertaining to the seed data, to search parameters, or both. Often, category nodes pertain to the categorical metadata about the seed data or about the user-entered search parameters. For musical items of content, category nodes may include, e.g., genre, artist, album, tempo, etc. In other words, if the seed data constituted a song, the category nodes may be all or a subset of the categories of metadata that are stored about that song, e.g., in a repository of content items. If the seed data is more general, such as two categories of metadata, e.g., jazz of the decade of the 1950s, then the category nodes may just pertain to "genre" and "date", although others may be employed as well. The representation of the central node and the category nodes is sometimes referred to in this description as the "second user interface".

Figure 5:
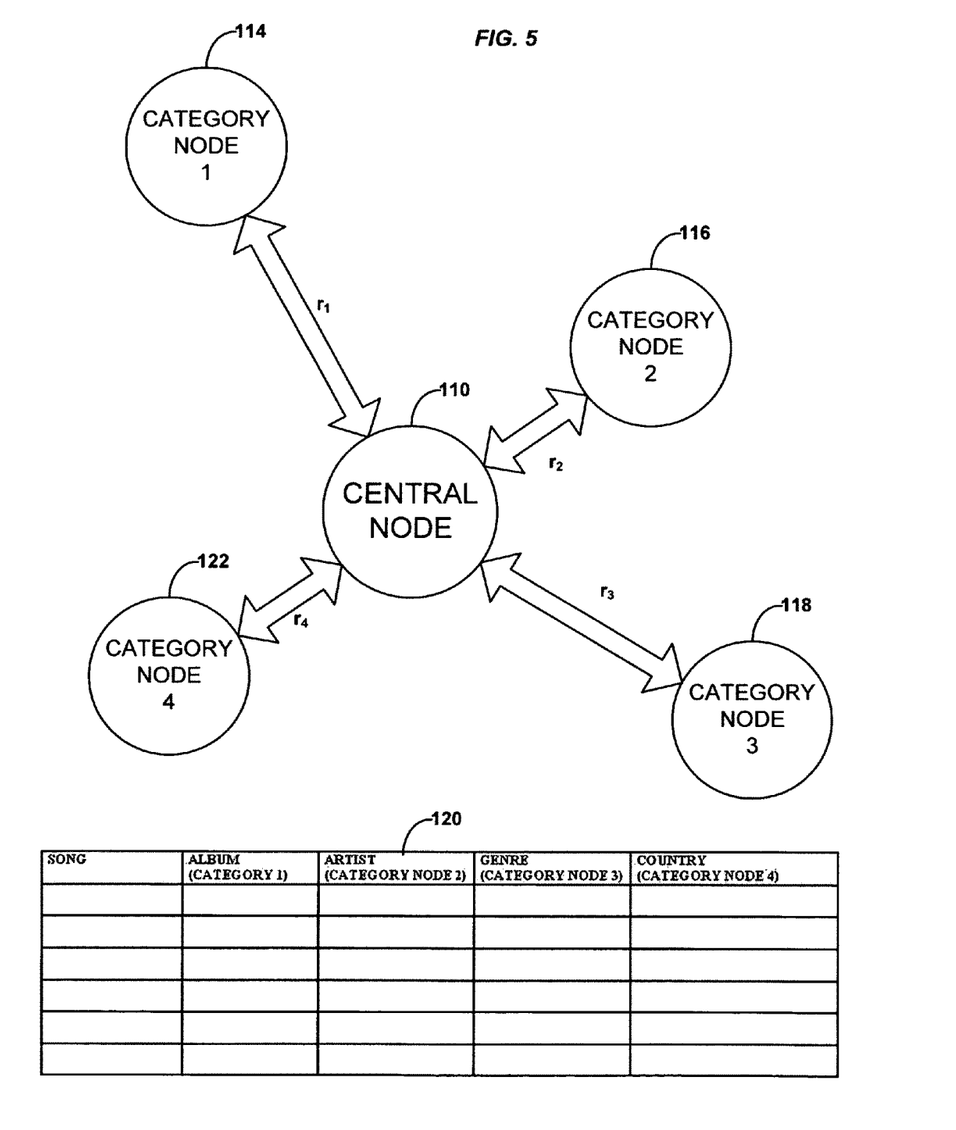
FIG. 5 illustrates a graphical user interface of a search scheme according to another embodiment of the invention.

The interface system and method allows for browsing and searching for items of content in a repository. Referring to FIG. 5, a central node 110 is shown with category nodes 1-4 represented by circles 114, 116, 118, and 122, each disposed at distances $r_1$, $r_2$, $r_3$, and $r_4$, respectively, from the central node 110.

Figures 6, 7:
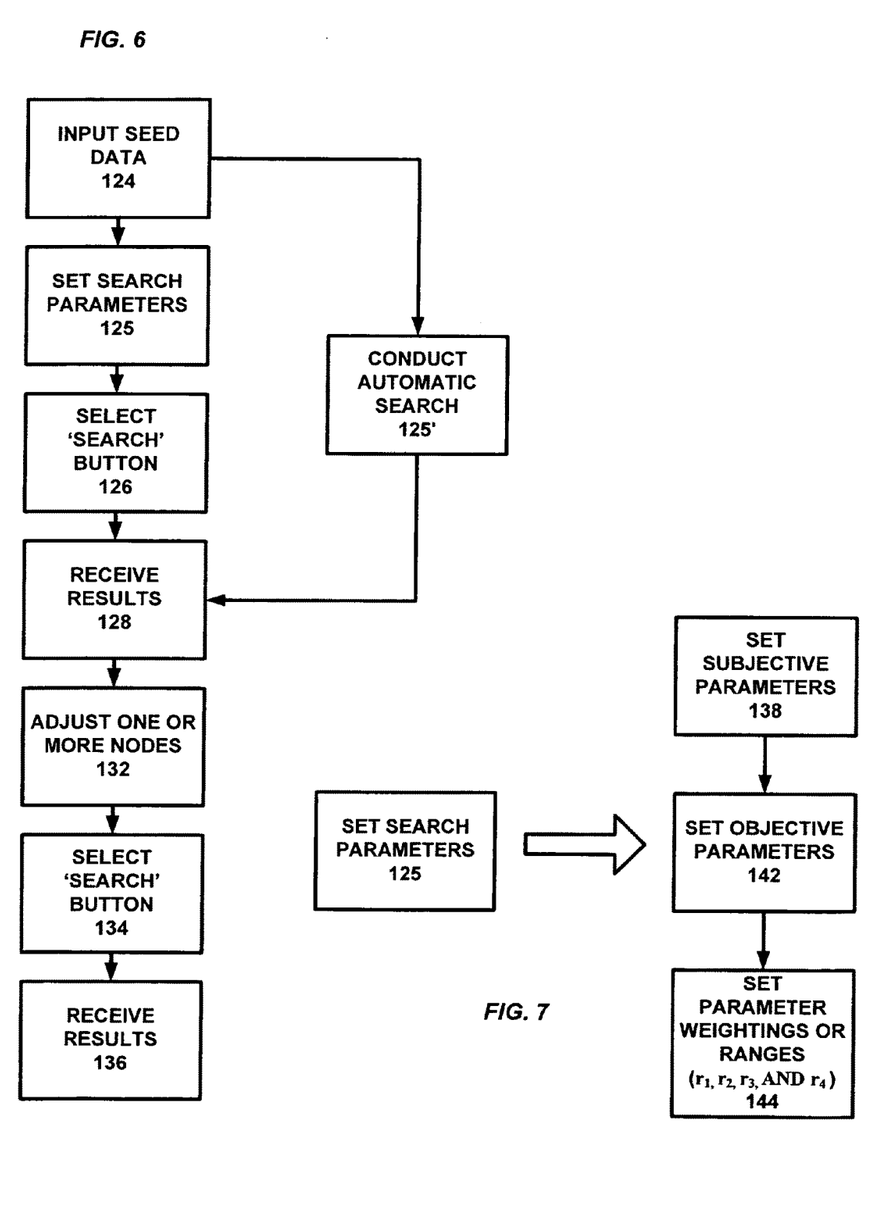
FIG. 6 illustrates a flow chart of a method according to another embodiment of the invention, in which category nodes surrounding a central node are used to initialize search values as well as to modify them.
FIG. 7 illustrates a more detailed flowchart of a portion of the method of FIG. 6.

Referring to FIGS. 5 and 6, in a first embodiment, the central node 110 represents seed data or search parameters and the category nodes represent various search categories or fields. In other words, the central node 110 may typify or be characteristic of the sort of content items the user wishes to have presented in the search results, the search results shown as element 120 in FIG. 5, in the specific embodiment of a search for music content items. The way a user enters (step 124 of FIG. 6) the seed data, i.e., the information to be searched, may be by way of a form or other known user interface, also called a "first user interface" in this description.

Once the user has input the information as the seed data, the search may be immediately commenced (step 125') or alternatively a set of parameters for the search can be set (step 125). Immediate commencement here means that the search operates on the basis of the seed data; the search itself may be started once the seed data are entered, or may be started upon user selection of a suitable "SEARCH" button. In this embodiment, the system and method suggest a set of category nodes based on the seed data, and the category nodes are set at default locations. For example, if a song title is entered as seed data, the system and method may automatically conduct a search for music that is similar to the seed data song. The same is conducted by generating one or more category nodes pertinent to the seed data song, placing the generated category nodes at default locations around the central node, and searching the repository based on these search settings. If a song is the seed data, the category nodes may be set to "release date", "genre", and "tempo". Default values for these may be set to "plus or minus five years from release date", "similar" genres as determined by a look-up table, and "similar" tempos, also as determined by a look-up table. A search may then be automatically conducted, and the results displayed in the search results table. This system and method may provide the user with often-desired results with a minimum of data to enter.

In the next embodiment, where the set of parameters for the search are set, the set parameters step can be automated or manual, and can generally be further divided into subjective (step 138) and objective (step 142) search parameters, as shown in more detail in FIG. 7. This embodiment has some similarities with the above embodiment, though it should be noted that there may be more user-involvement and user-entered data in this embodiment than in the prior one.

Subjective search parameters are generally those that rely on editorial input, such as whether a genre, album, or artist is similar to another genre, album, or artist. Subjective search parameters can also be used to search for content items having a particular quality, either a recording quality or artist quality. These types of search parameters are generally less susceptible to automation than objective search parameters.

Objective search parameters are generally those that rely less on editorial input. For example, the date of release of a content item is generally fixed, and an objective search may be used to search for items of content that were released on or near the same date, on a range of earlier dates, on a range of later dates, etc. Objective search parameters may also be employed to search, e.g., for items of content by a particular artist, or items of content of a particular genre, etc. Such search parameters are generally susceptible to automated searching.

Referring back to FIG. 5, the category nodes may be chosen in a number of ways. First, the characteristics of the seed data may determine the category nodes. If, e.g., the seed data includes a genre, and a subjective search parameter is used to search for content items like that genre, it may be useful to have a category node for genre. Another way to choose which category nodes appear is by user choice. For example, as part of a "VIEW" menu the user may be prompted to choose the category nodes which appear on the search screen. A further way to choose the category nodes is via a look-up table. For example, if the user chooses particular seed data categories, and/or particular categories to be shown from the "VIEW" menu, the system may employ a look-up table to automatically suggest more categories and thus category nodes. Yet a further way may be by use of an initial set of category nodes, chosen to be appropriate for each type of content item, with the user prompted to add or subtract category nodes as desired for a given search.

The next step may be to set the parameter weightings or ranges (step 144). Where weightings are employed, the distances $r_1$, $r_2$, $r_3$, and $r_4$, may be employed to indicate the relative weightings of the various categories. For example, it may be that a user wishes to hear slow music, without regard to its genre. In this case, the tempo category node would be closer to the central node that the genre node.

Where ranges are employed, the distances $r_1$, $r_2$, $r_3$, and $r_4$ may be employed to indicate the range of acceptable search results. The same may indicate one-sided ranges or two-sided ranges, where the data is classifiable into such. For example, the range may be "all music released after a certain date" for a one-sided range. Alternatively, the range may be "all music released between a first date and a second date" for a two-sided range.

If, e.g., $r_1$ is large, then that may indicate that the search results need only be somewhat related to the seed data. In other words, the larger $r_1$ is, the larger the range of searching may be and still be acceptable as a search result to the user. More results will likely be obtained. Conversely, the smaller $r_1$ is, the narrower and more focused the search will be and thus less results will generally be obtained. Thus, e.g., if it is desired to only find music in the jazz genre and very similar music, then the seed data may contain a "jazz" datum and the genre category node may be set close to the central node. In some embodiments, it may be desired to fix a particular seed data such that only results are shown with that data. Such fixing may occur via, e.g., a radio button, or by overlapping the category node and the central node. In the above example, it may be desired to fix the jazz data so only music in the jazz genre is uncovered. A category node at a large distance from the central node may be employed to allow a wide range of search results to be found. For example, if the seed data includes a rock genre, and the category node is a large distance from the central node, then the search results may uncover classic rock, modern rock, and various other rock genres.

In some embodiments, as $r_1$ decreases, the radius of the corresponding category node increases, e.g., simultaneously, further emphasizing the similarity of the search results to the desired seed data. In other embodiments, the radius of the category node may indicate a range of acceptable search results, with the center of the category node at the center of the range. As discussed in more detail below, e.g., if a search is performed for music of the 1950s, a category node may be centered on an axis timeline indicating the year 1955, and the radius of the category node may be such that the years from 1950 to 1960 are covered by the category node. It should be noted that the specific distance "$r_1$" was described above for clarity; one of ordinary skill in the art will understand that the above description may apply to any of the category node distances, as well as combinations of the same.

Following the choice of category nodes and setting of parameter ranges, the search may be performed (step 126), with a consequent output of results, such as in the form of a table 120. In one implementation, the category nodes closest to the central nodes may be deemed to be most discriminating, and they may serve the role as the first sorting field. The next closest may be the next sorting field, and so on. Subsequent modifications to the category nodes, such as the user moving a category node closer to or further from the central node, may be immediately reflected in the search results, or may be reflected in the search results following a manual input, such as the user selecting a "SEARCH" button.

As an example of the above procedure, a user may choose a song that they enjoy, and then employ the system to find similar songs. Specifically, the user may desire to find songs similar to "Bridge Over Troubled Water". The system can glean various information from its metadata about the chosen song, and can then search for other songs based on that information. To start, this song may be generally considered melancholy, and metadata may be included with recordings of this song that indicate its "mood" field is "melancholy". As metadata exists for "mood", the same may be a displayed category node. Other pertinent category nodes may include genre (folk), tempo (slow), and release year (1970).

An initial setting may be for all category nodes shown, or alternatively all major category nodes shown, or alternatively all categories for which data is available shown. The nodes may be at their appropriate respective distances from the central node for this song, in which case the song itself would be the most appropriate search result and may thus be listed first. Other songs may also be shown in the search results if they fit the same category values. In this example, the search results may list all songs released in 1970 that are slow melancholy folk songs. However, a default breadth may also be accorded the categories, so that more or less search results are displayed.

The user may then narrow the search results by moving the category nodes closer to the central node. Alternatively, following the initial category node display, the user may click one of the category nodes, causing a filtering or sorting of search results to occur, i.e., removing all entries without that seed data's category or listing the search results with that seed data's category first, respectively. In the above example, clicking on the mood node may cause the mood node to move towards the center, and then the search results may be limited to those content items with a melancholy mood. In an alternative embodiment, the melancholy mood content items may appear first in the list. Similarly, clicking 'genre' may move the genre node to the center, and then the songs may be filtered such that only folk songs appeared, or alternatively, in a cumulative search embodiment, only folk songs that are melancholy appear in the search results. This filtering or sorting may then continue for the tempo and the year and any other desired nodes or search fields. One of ordinary skill in the art will understand, given this teaching, that numerous variations of this technique may be employed, these also falling within the scope of the invention.

Figure 8:
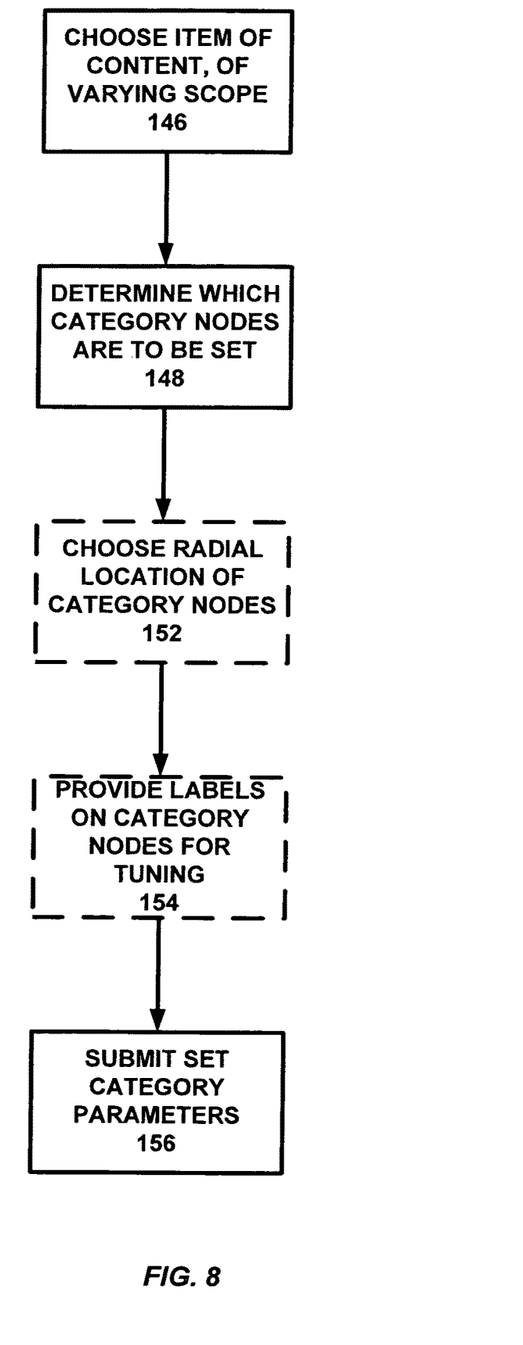
FIG. 8 illustrates a flow chart of a method according to another embodiment of the invention, in which category values are set for an item of content or a group of items of content.

The node diagram may further be employed as a means to enter metadata about a given item or items of content. In this embodiment, an item of content is initially chosen (step 146), or alternatively a group of items is chosen. For example, the item may be a single item such as a song, or a grouping of items such as an album. For video content, such as videogames or movies, the grouping of items of content may be a videogame and a soundtrack, or a movie and a soundtrack, and so on.

The next step is for the category nodes to be chosen (step 148). These may be chosen in the manner discussed above. In particular, the same may be suggested by the system and method as being relevant to the given item of content. For example, if a particular song is the given item of content, default category nodes may be provided such as album, artist, and genre. In another implementation, the category nodes may be manually chosen by the user, often on the basis of what information the user is aware of pertaining to the content item or items. In another implementation, the category nodes are chosen by a combination of the above techniques.

Once the category nodes are chosen, the next step is to set the category nodes at appropriate locations (step 152) in order to attribute metadata about the item of content according to category node and location. For example, for a given song, the category nodes may be slid, e.g., along radii extending from the central node, to positions that indicate the value of the category, e.g., a genre of "jazz", or an artist field corresponding to "The Beatles". In some cases, such as for artist or album, the granularity, i.e., the number of possible entries, may be such that a large number of entries are passed with only a small movement of the category node along the radius. In this case, it may be preferred to set one or more less-granular nodes first. In other words, it may be preferable to set the genre node first, and have the same automatically or manually filter the "artist" or "album" radial line along their category node radials.

For highly-granular or less-granular data, pop-up labels (step 154) may be provided that appear as the category node slides, in order to alert the user as to the current location of the category node. If sliding along an artist radial, e.g., there may be numerous entries, and the pop-up label would alert the user as to whether the category node was pointing at the artists, e.g., whose names start with "B" as opposed to the artists whose names start with "A" or "C". While these are shown as separate steps, it should be noted that typically the practice of step 152 will include the use of step 154.

In an alternative embodiment, for categories with a large range of possible entries, such as "artist" or "album", the user may be prompted to manually type part or all of the name, in which case a pop-up list may appear from which the user can select the desired entry. In yet another embodiment, the user may enter a new entry.

Setting category nodes can also involve setting ranges, such as where a user wishes to identify a song as being from the 1950s.

Finally, after the category nodes are set, which may include any of the techniques mentioned above, the data is submitted to the source of metadata (step 156). This submission may also be designed to occur automatically.

Figure 9:
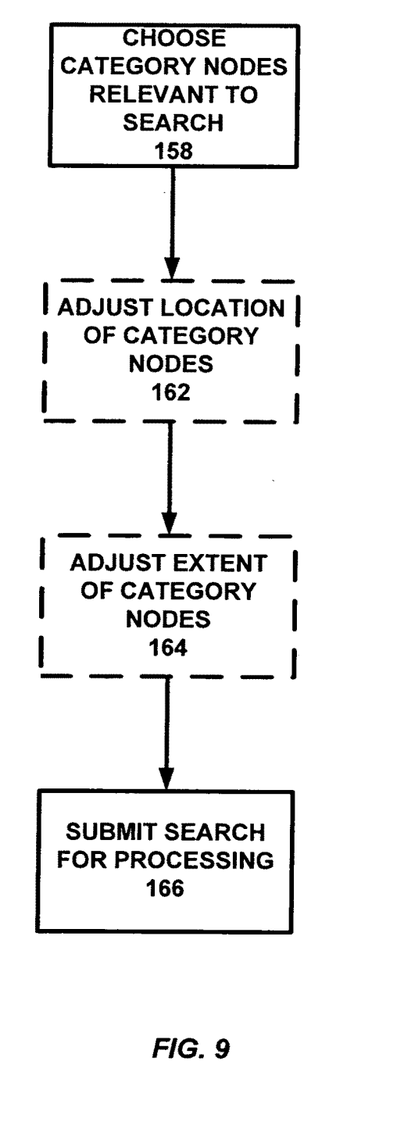
FIG. 9 illustrates a flow chart of a method according to another embodiment of the invention, in which category values are set and the same used as seed data for a search for items of content.

It was noted above that the seed data may be entered by way of a form interface. However, the system itself may form the basis and method for entering seed data. Referring to FIG. 9, a user may choose certain category nodes relevant to a search that they desire to conduct (step 158). These category nodes may be moved to particular positions, as noted above, to correspond to particular values of the category metadata they represent (step 162). The extent of the category nodes may be adjusted to accommodate, e.g., range data. Finally, the search as parameterized by the above method may be submitted for processing (step 166).

In more detail, a set of category nodes may be provided which slide along axes, each axis representing a particular category of metadata. By adjusting the nodes to particular positions along the axes, the user may enter the seed data. For example, if the user is interested in searching for music of the 1950s, the user may move the category node along an axis that designates time. This axis may indicate all years for which data is available about content items resident in the repository, and thus may span hundreds of years. The user may even, in some embodiments, adjust the areal extent of the category node such that the circle (or other shape) designating the node covers the decade of the 1950s on the axis timeline. Of course, other such interface tools may be provided such that the user could designate that the search uncover music written in the 1950s or later, or the 1950s or earlier, or any other desired range. In this implementation, the nodes' distance of travel and subsequent range of covered categories and subcategories may be configured to be sufficient to permit the user to enter a wide and varying range of seed data.

Additional variations and implementations are also possible. For example, the searched-for files can be any type of data files—audio, video, text, data, and so on. While information is generally retrieved via metadata, such as from various sources of metadata or other media database sites where such data are determined by an editorial board, certain information may be obtained via waveform analysis or other automatic means. For example, for music items of content, waveform analysis may determine major keys, minor keys, time signatures, beats per minute, etc. While the systems and methods have been disclosed in the context of online stores for media content, the same may also be employed on a single computer or LAN or WLAN in order to classify and browse items of content stored locally.

While the term "computer" has been used, this term is intended to encompass any computing machine, including desktop computers, laptop computers, handheld computers, tablet computers, smart phones, personal digital assistants, game consoles, set top boxes and any other device to or from which data may be transferred. Various other examples could also be formulated given this teaching.

According to the present invention, as fully described above, systems and methods are provided for providing user interfaces for browsing or search functionality for, e.g., online stores or other repositories of content items, including individual computers or small networks. The user interfaces may include a graphical metaphor of one or more planets surrounding a central seed node, the central node indicating seed information and the planets indicating search results relevant to the seed information.

While the invention has been described with respect to certain embodiments, it should be clear to one of ordinary skill in the art, given this teaching, that the invention is much broader than the embodiments shown.

Accordingly, the description represents some, but not all, representations, and therefore the scope of this invention is to be limited only by the claims appended to this description.

What is claimed is:

1. A non-transitory computer-readable medium, comprising instructions for causing a computer to implement a method of graphically setting category information or metadata for a content item or group of content items, the method comprising:
   a. providing an entry window for a user to enter or select a content item or a group of content items;
   b. populating a window with at least one parent node corresponding to the entered or selected content item or group of content items and at least one child node, the child node indicating a category of metadata pertaining to the content item or group of content items, a distance of the child node from the parent node indicating a value of metadata in the category; and
   c. receiving user input graphically adjusting the distance of the child node from the parent node in the window by sliding one relative to the other, the distance indicating the value of the metadata within the category, and displaying a pop-up label indicating the value of the metadata within the category, the value dynamically updating as the distance of the child node from the parent node changes;
   d. such that the metadata value for the category for the content item or group of content items is set by the user through the graphically adjusting.

2. A non-transitory computer-readable medium, comprising instructions for causing a computer to implement a method of searching for one or more content items in a repository containing a plurality of content items, at least one item of metadata associated with each content item to be searched, the method comprising:
   receiving seed data, the seed data including at least a value of metadata in a category;
   b. displaying a parent node indicating the received seed data on a user interface;
   c. displaying at least one child node on the user interface, the child node associated with the category of metadata;
   d. receiving user input graphically adjusting a distance of the child node from the parent node indicating the received seed data on the user interface by sliding the child node along an axis, the axis indicating metadata in the category, and displaying a pop-up label indicating the value of the metadata within the category at a current distance of the child node from the parent node, the value dynamically updating as the distance changes the location of the child node along the axis associated with a value of metadata within the category, the distance between the parent node indicating the received seed data and the child node indicating a range of metadata in the category;
   e. conducting a search, the search results determined at least in part by comparing the range of the metadata with the value of metadata associated with each of a plurality of content items in a repository; and
   f. displaying search results from the search.

3. The medium of claim 2, wherein the displaying step includes displaying search results in a list in a window.

4. The medium of claim 2, wherein the displaying search results step occurs automatically, via user selection of a search function or via user entering of a seed content item, and wherein if the displaying search results step occurs via a user entering of a seed content item, then the method further comprises:
   a. automatically displaying at least one child node applicable to the seed data as determined by a look-up table keyed to at least one metadatum associated with the seed data; and
   b. setting a default search range based on the at least one metadatum available about the seed data.

5. The medium of claim 2, wherein the displaying at least one child node step includes a step selected from the group consisting of:
   a. displaying at least one child node according to a look-up table based on the seed data;
   b. displaying at least one child node according to a user selection;
   c. displaying at least one child node according to a type of content searched; or
   d. a combination of at least two of the above.

6. The medium of claim 1, wherein the method further comprises setting an initial distance between the child node and the parent node, the initial distance being inversely related to a relevance of the metadata in the child node to the metadata in the parent node.

7. The medium of claim 1, wherein the method further comprises setting an initial size for the child node, the initial size being directly related to the relevance of the metadata in the child node to the metadata in the parent node.

8. The medium of claim 2, further comprising setting an initial distance between the child node and the parent node, the initial distance being inversely related to a relevance of the metadata in the child node to the metadata in the parent node.

9. The medium of claim 2, further comprising setting an initial size for the child node, the initial size being directly related to the relevance of the metadata in the child node to the metadata in the parent node.

10. The medium of claim 2, wherein the repository is a collection of content items stored on one or more servers connected to the internet, the collection associated with an online store.

11. The medium of claim 2, wherein the repository is a collection of content items stored on a local area network or on a computer.

12. The medium of claim 2, wherein the seed data is selected from the group consisting of: a song, a movie, a video game, an album, an artist, a genre, and a combination of these.

13. The medium of claim 2, wherein the user entering of seed data includes receiving the seed data from a form containing user-entered text.

14. The medium of claim 2, wherein the seed data is entered by a user selecting a content item, and further comprising receiving seed data about the content item.

15. The medium of claim 2, wherein the user entering of seed data includes the user selecting a content item while the content item is currently playing.

\* \* \* \* \*